United States Patent
Oxford et al.

(10) Patent No.: US 9,817,953 B2
(45) Date of Patent: Nov. 14, 2017

(54) SYSTEMS AND METHODS FOR ESTABLISHING AND USING DISTRIBUTED KEY SERVERS

(71) Applicant: Rubicon Labs, Inc., San Francisco, CA (US)

(72) Inventors: William V. Oxford, Austin, TX (US); Gerald E. Woodcock, III, Austin, TX (US)

(73) Assignee: Rubicon Labs, Inc., San Francisco, CA (US)

( * ) Notice: Subject to any disclaimer, the term of this patent is extended or adjusted under 35 U.S.C. 154(b) by 620 days.

(21) Appl. No.: 14/497,652

(22) Filed: Sep. 26, 2014

(65) Prior Publication Data
US 2015/0089231 A1    Mar. 26, 2015

Related U.S. Application Data

(60) Provisional application No. 61/882,796, filed on Sep. 26, 2013.

(51) Int. Cl.
  *G06F 21/10*   (2013.01)
  *H04L 9/08*    (2006.01)
  *H04L 29/06*   (2006.01)
  *H04L 29/08*   (2006.01)

(52) U.S. Cl.
  CPC ............ *G06F 21/105* (2013.01); *G06F 21/10* (2013.01); *H04L 9/0869* (2013.01);
  (Continued)

(58) Field of Classification Search
  CPC ..................................................... G06F 21/105
  See application file for complete search history.

(56) References Cited

U.S. PATENT DOCUMENTS

| 5,872,849 A | 2/1999 | Sudia |
|---|---|---|
| 6,182,139 B1 | 1/2001 | Brendel |

(Continued)

OTHER PUBLICATIONS

International Preliminary Report on Patentability (IPRP) issued for PCT Application No. PCT/US14/57615 dated Apr. 7, 2016, 9 pages.
International Search Report and Written Opinion issued for PCT Application No. PCT/US14/57615, dated Sep. 26, 2014, 10 pages.

*Primary Examiner* — William Powers
(74) *Attorney, Agent, or Firm* — Sprinkle IP Law Group

(57) ABSTRACT

Systems and methods in which multiple key servers operate cooperatively to securely provide authorization codes to requesting devices. In one embodiment, a server cloud receives a device authorization code request and selects an "A server". The "A server" requests authorization from one or more "B servers" and authorizes the "B servers" to respond. The "B servers" provide authorization to the "A server", and may provide threshold key inputs to enable decryption of device authorization codes. The "A server" cannot provide the requested device authorization code without authorization from the "B server(s)", and the "B server(s)" cannot provide the requested server authorization code and threshold inputs without a valid request from the "A server". After the "A server" receives authorization from the "B server(s)", it can provide the initially requested device authorization code to the requesting device.

19 Claims, 8 Drawing Sheets

(52) U.S. Cl.
CPC ........ *H04L 63/062* (2013.01); *H04L 67/1004* (2013.01); *G06F 2221/0753* (2013.01); *G06F 2221/2145* (2013.01); *H04L 2209/60* (2013.01); *H04L 2209/603* (2013.01)

(56) References Cited

U.S. PATENT DOCUMENTS

| | | |
|---|---|---|
| 7,289,632 B2 | 10/2007 | Buer |
| 7,362,868 B2 | 4/2008 | Madoukh |
| 7,552,321 B2 | 6/2009 | Rockwood et al. |
| 9,571,164 B1 * | 2/2017 | Luo .................... H04B 5/0056 |
| 2004/0247131 A1 * | 12/2004 | Buer ................ G06Q 20/3674 380/278 |
| 2005/0144019 A1 * | 6/2005 | Murakami .............. G06F 21/10 705/59 |
| 2007/0288751 A1 * | 12/2007 | Rits ........................ G06F 21/52 713/168 |
| 2008/0307054 A1 * | 12/2008 | Kamarthy ............ H04L 63/065 709/206 |
| 2011/0289314 A1 | 11/2011 | Whitcomb |
| 2013/0097424 A1 * | 4/2013 | Simon .................. H04L 9/0836 713/171 |
| 2013/0170644 A1 | 7/2013 | Lambert |

\* cited by examiner

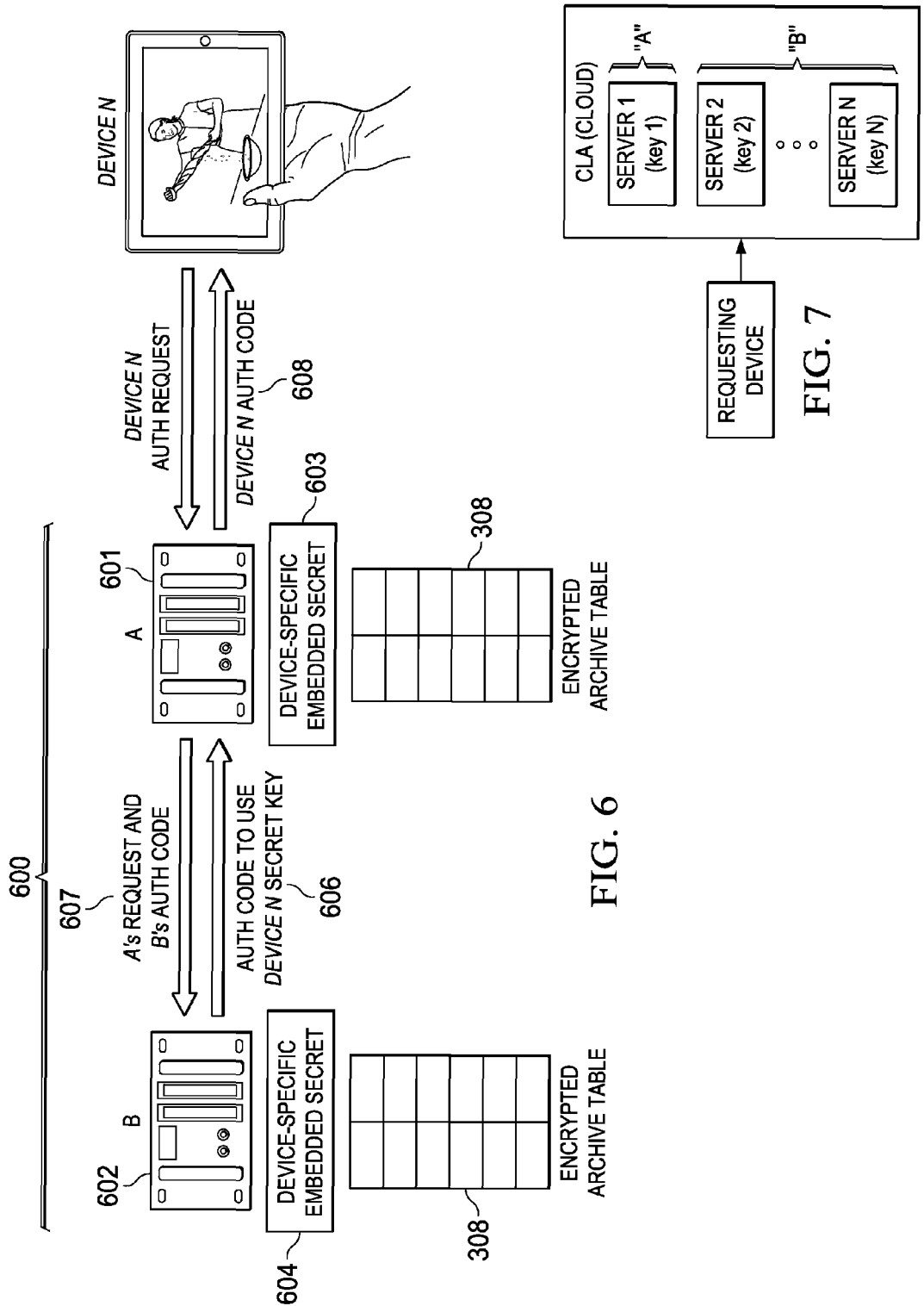

SYSTEMS AND METHODS FOR ESTABLISHING AND USING DISTRIBUTED KEY SERVERS

CROSS-REFERENCE TO RELATED APPLICATIONS

This application claims a benefit of priority to U.S. Provisional Patent Application No. 61/882,796, filed Sep. 26, 2013, which is incorporated by reference as if set forth herein in its entirety.

TECHNICAL FIELD OF THE INVENTION

This disclosure relates in general to security in computer systems. More specifically, this disclosure relates to systems and methods for securing information associated with processes of a computing system through the use of cooperative key servers.

BACKGROUND

Related Art

A key server is a device that serves cryptographic keys to other devices. The key server and the other devices may be computers that are communicatively coupled via a network such as the Internet. In order to securely distribute a key to a requesting device, it may be necessary that the key server be accessible to a requesting device over a secure connection. That connection may be accomplished via various means, some of which may include encrypted communications links such as a VPN, but there are many other options, including private "back-channel" (i.e., non-public) connections, where the need for encryption is not a requirement.

A key server essentially maintains a database of "secret keys" including device IDs and the associated secret keys associated with those devices that are associated with the key server. These device IDs and secret keys are used by the key server for various reasons, some of which may include the ability to allow software to execute in a secure mode on a particular device. The secret key database is typically archived after being encrypted with a global archive key.

One of the problems with this type of system, however, is that although the encrypted archive is secure and can be published, the overall security of the system then becomes dependent on the global archive encryption key. If that key is truly global (as it may be in the case where multiple users must have the ability to use the encrypted archive) and if it is somehow leaked, then the whole system may be compromised. Thus, this kind of global key is often stored and used only at the key server.

Additionally, the key server may typically reside at a single IP (Internet Protocol) address. However, this arrangement may also make the key server susceptible to denial of service (DoS) attacks. In other words, hostile parties can flood the IP address of the key server with multiple requests, thereby effectively shutting down the entire system. One means by which this problem may be remediated is to maintain multiple copies of the key server, distributed in geographically diverse locations. Then, any attempt to access this (duplicated) server first goes through a set of gateway routers, which then may resolve the single server IP to multiple secondary IP addresses.

However, in the case where the key server is duplicated at various secondary IP addresses, then the misappropriation of one such key server is tantamount to compromising the entire system. In this case, the overall system's security is then completely determined by the one key server installation that possesses the weakest physical or logical security.

Thus, there is a need to provide improved means for serving cryptographic keys, where the associated systems are less vulnerable to problems such as the possible compromise of a global key or the occurrence of a DoS attack.

SUMMARY OF THE INVENTION

This disclosure is directed to systems and methods for constructing secure systems that solve the problems discussed above. Embodiments of the invention include systems and methods in which multiple key servers operate cooperatively to authorize each other to perform required functions involved in securely providing authorization codes (also referred to as authcodes) to requesting devices.

In one particular embodiment, a device (hereafter referred to as the "target device") requests an authcode from a Licensing Authority (LA), which consists of at least two key servers. The target device's request may be made to either one of the two key servers; the key server that receives the request is designated as the "A server". In this embodiments, this "A server" cannot produce the requested authcode for the target device without itself being authorized to do so by the other key server associated with the LA (referred to as the "B server"). This authorization is accomplished by means of a second authcode that is supplied by the "B server" to the "A server" in response to an authorization request from the "A server". Neither server may initiate an authorization action without first receiving a request. These two key servers must, in this embodiment, therefore authorize each other to perform their respective functions and neither one of the servers may act alone or in a unilateral fashion to produce an authcode for any target device. Note that, from the "B server" perspective, the "A server" authcode request is essentially similar to an original target device authorization request. However, since the "A server" is recognized as being part of the LA, then the "B server" can know that it may issue the "A server" authcode without requesting additional LA authorization. This will avoid an infinite loop situation.

In some embodiments, key servers may be provisioned in a cloud based computing environment. In the case where there are only two key servers (e.g., in the cloud), then each key server must, in this embodiment, enlist the cooperation of the other key server in order to issue an authcode to a target device. In other words, in this embodiment there is only one "A" server and only one "B" server. While this may seem to be the minimal functional arrangement, this situation may lead to a number of difficulties in the practical deployment of such a system.

First, if there is no "higher authority" (i.e., the cloud is self-authorizing as described above), then the cloud may be established with all of its authcodes predetermined from the outset. That is due to the fact that a recursively-satisfied request for a new authcode will lead to an infinite loop (A asks for an authcode from B, which then turns around and asks for permission to create the authcode from A, etc.). Of course, any pre-existing authcodes will not incite this looping situation. While this "no new authcodes" limitation may be acceptable in some cases, it is not very flexible. However, if all of the possible authcodes for the LA are already in existence from the beginning, then once a particular key server has received an authcode for a specific function, then it need never request that specific authcode again, thus defeating the purpose of a distributed system. Thus, the authcodes that are created and used for a specific key server inside a LA may be "single-use" authcodes. In other words, they may "automatically expire" as soon as they are used. One specific method by which this singe-use functionality may be accomplished will be described below.

A second problem that may arise in embodiments of the two-server cloud solution is that, if one of the key servers is taken offline (for example, due to a denial of service attack), then the entire key-server system cannot function. A similar complication may arise if either of the two servers is somehow compromised, where an attacker may then potentially take over the system. In this latter case, then if one of the servers is compromised, then the other may be immediately reinitialized to avoid this potential key server takeover situation.

For these reasons, it is desirable to have a system with at least three key servers, but even the triple-server architecture may be nonetheless a potential target for the determined attacker. As was discussed earlier, using duplicated distributed servers can lead to unintended weaknesses, but the "A/B" server behavior described is clearly advantageous. Thus, it would be desirable to enable this kind of functionality on a wider scale, with as many independent yet logically linked key servers as possible.

In another embodiment, a cloud-based licensing authority (CLA) may use a pool (cloud) of identically configured servers, but with different embedded secrets (that make be used to create encryption keys). Thus, the logical capabilities of each key server in the cloud may be identical, but the actual means by which they accomplish these capabilities (for example, the authcodes for each of the individual key servers in the cloud) are distinctly different and may only be useful for the particular key server for which the specific authcode is designated.

In this exemplary system, when a target device requests an authorization code from a CLA, one of the servers in the pool is selected to act as the "A server", and one or more of the remaining servers in the pool is selected to act as the "B server". Just as before note that the "B server" will know that the "A server" is a member of the LA and thus, it can issue an authcode in response to an "A server" request without requiring further LA authorizations. However, in the case where the CLA comprises three or more key servers, then there are further enhancements to the "A server" authcode response procedure that can be used in order to increase the flexibility and robustness of the CLA in the event of a DoS attack as well as increasing the security of the overall system against insider attacks.

In addition, embodiments of a CLA comprising a large number of individual key servers may support more advanced functionality in an efficient but nonetheless still secure manner, such as a requirement that more than a single "B server" respond to an "A server" authorization request. Other more advanced functionality may include the case where an original requesting target device may even be a member of the very same group (e.g., cloud) of key servers that can authorize that target device. Thus, the cloud may be set up in such a way as to serve up keys and authcodes to (e.g., to authorize) individual members of its own group. However, the overall security of such a system may be dependent on the physical security of the various individual key servers and the minimum required number of "B servers" that must respond to the "A server" request. This self-referencing (recursive) behavior can be used to create a system with both greater flexibility and yet at the same time, greater efficiency than other, non-recursively implemented systems. However, as mentioned earlier, there are some constraints that must be observed in order for embodiments of such a system to operate correctly. Specifically, in the case where the requesting target device is a member of the CLA, then there are some practical limitations on the nature of the authcodes that may be issued by one member of the cloud for another member of the same cloud. These limitations will be addressed in more specific detail below.

Returning to the earlier discussion in embodiments where it is desirable to have more than a single "B server" respond to an authorization request from an "A server", this functionality can be accomplished in a number of ways. One embodiment to implement this would be to use a threshold encryption mechanism to encrypt the "A server" authcode response from the "B server" group. In this case, the "A server" is still a single key server, but the "B server" functionality is shared by a group of other key servers.

A threshold encryption mechanism is a method to "split" a key over multiple distinct and different fragments in such a way to enable a number ("m") of individual key fragments to be combined to recreate the value of the overall key. The mathematical principles for such a system are well known and the known drawbacks of such systems (the potential for "traitor collusion", etc.) are mitigated in this particular case, where the collective key server cannot act unilaterally. Using this technique, a pre-determined minimum number ("m" out of the total number "n") of "B server" responses containing "key fragments" must be received by the requestor in order to correctly reconstruct a shared secret key. No one device has enough information on its own to reconstruct this key and the minimum number of key fragments that must be combined together in order to correctly reconstruct the key is termed the threshold. Thus, an "A server" can request an encrypted authcode and a set of key fragments from the rest of the key servers in the cloud (which are thus potentially part of the "B server" group).

Note that in one embodiment, this threshold can be met by any "m" distinct members of the total cloud, so in this case, there may be no one server that is more critical than any other out of the group. Other embodiments may include more complex combinations of multiple threshold-encryption groups that must respond along with other constraints that may act together to increase the CLA system's efficiency or robustness against attack. Thus, this combination of "A/B" servers with a threshold encryption mechanism produces an overall CLA system that embodies the strengths of a fully distributed system while mitigating the disadvantages of a standard threshold-encryption based key server system.

In one embodiment, each of the plurality of key servers is identically configured, so that each server can act to carry out either the "A" server or "B" server functionality. Thus, all of the units in this CLA system may have the logical capability to operate (individually) as either an "A server" by itself or as a part of a "B server" group (but in some embodiments not as both at the same time). This last constraint forces an "A server" to receive its own authcode from a different key server. Another constraint may include, for certain embodiments, the requirement that any "B server" responses must come from key servers that belong to the same CLA system as the "A server".

In one embodiment, the initial target device authorization code request may be broadcast to all of the plurality of key servers, and the first of the servers to respond may then function as the "A" server. Another embodiment may incorporate a load balancer intermediary that may receive the initial target device authorization request and then identify one of the key servers as the "A" server based on a number of criteria. The load balancer also may or may not participate in the selection of the key servers that function as a part of the "B server" group from the available CLA key server pool. If multiple servers act as the "B" server, each of the "B" servers may transmit a corresponding threshold key input to the "A" server. In this case, the "A" server can only transmit the device authorization code to the requesting target device after receipt of at least a threshold number of the threshold key inputs from the "B" servers. The target device that makes the initial authorization request may be any type of device, possibly including a key server from the CLA itself or from a different CLA.

Other embodiments may include multi-server licensing authority systems, where more than one key server may be set up as virtual machines, all residing on the same physical machine as well as individual physically distinct servers that are configured for use in these systems. Another alternative embodiment includes a computer program product that can be executed by a computer to perform the functions of a key server as described herein. Yet other alternative embodiments include methods for securely providing device authorization codes, where multiple key servers operate cooperatively to authorize each other to provide authorization codes to requesting devices.

Numerous other embodiments are also possible.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting, embodiments illustrated in the drawings, wherein identical reference numerals designate the same components. The invention may be better understood by reference to one or more of these drawings in combination with the description presented herein. It should be noted that the features illustrated in the drawings are not necessarily drawn to scale.

FIG. 6 illustrates an embodiment of a duplex "A/B" licensing authority.

FIG. 7 illustrates the logical structure of one embodiment of a distributed Cloud-based Licensing Authority (CLA).

DETAILED DESCRIPTION

Figure 1:
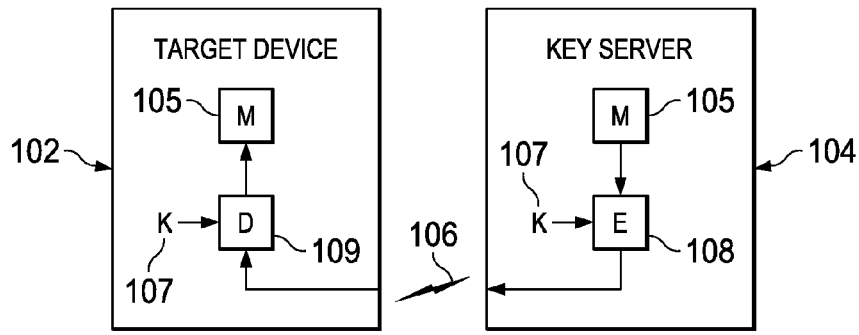
FIG. 1 depicts one embodiment of a system for securely transmitting a secret message M from a key server to a target device.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk or HD), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. For example, though embodiments as described herein have been described in conjunction with their implementation in the context of a recursive security system, it will be noted that other embodiments may be usefully applied in other contexts to secure process working sets.

Those of ordinary skill in the art will appreciate that any term or terms with which these examples or illustrations are utilized will encompass other embodiments that may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment."

Embodiments of the present invention can be implemented in computers communicatively coupled to a network (for example, the Internet, an intranet, an internet, a WAN, a LAN, a SAN, etc.), another computer, or in a standalone computer. As is known to those skilled in the art, the computer can include a central processing unit ("CPU") or processor, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, etc.), or the like. In embodiments, the computer has access to at least one database over the network.

ROM, RAM, and HD are computer memories for storing computer-executable instructions executable by the CPU or capable of being compiled or interpreted to be executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, JavaScript, or any other programming or scripting code. In an embodiment, HTML may utilize JavaScript to provide a means of automation and calculation through coding. Other software/hardware/network architectures may be used. In one embodiment, the functions of the present invention may be distributed in the network. Communications between computers implementing embodiments of the invention can be accomplished using any electronic, optical, radio frequency signals, or other suitable methods and tools of communication in compliance with known network protocols. In another embodiment, this communication between systems may be effected by using a printed medium, where a user can provide the communicated data to a target "endpoint" system by entering it manually.

Additionally, the functions of the disclosed embodiments may be shared/distributed among two or more computers in or across a network. Communications between computers implementing embodiments can be accomplished using any electronic, optical, radio frequency signals, or other suitable methods and tools of communication in compliance with known network protocols. It will be understood for purposes of this disclosure that a module is one or more computer processes, computing devices or both, configured to perform one or more functions. A module may present one or more interfaces that can be utilized to access these functions. Such interfaces include APIs, web services interfaces presented for a web services, remote procedure calls, remote method invocation, etc.

As shown in FIG. 1, broadly speaking, encryption systems comprise one or more devices 102 (often referred to as "target devices" or "endpoint devices", one or more key servers 104 collectively comprising a Licensing Authority (LA), and a connection 106 between the two. The goal of the system is to securely exchange a message 105 over the connection 106. The message 105 may be, for example, a secret device hardware key, a confidential e-mail or the like.

If the message 105 contains sensitive information (i.e., its knowledge by some external party other than either target device 102 or key server device 104 could be detrimental or otherwise harmful or undesired by an entity), then one approach is to perform an encryption 108 on the message 105 with a (secret) encryption key 107 prior to transmitting it to the other party in the communication 106. Once the communication 106 reaches its intended receiver (in this example, the receiver is the device 102, but the same process can be accomplished in the other direction as well), then the receiver securely decrypts 109 the communication 106 to yield the original message 105, using the encryption key 107. The encryption key 107 may be a shared secret; in other words, a secret that is known by the parties on either end of the connection. If the shared secret encryption key 107 is ever discovered by another party (by any means), then the security of the connection 106 between 102 and 104 can be compromised, potentially exposing all sensitive information that is transmitted between the sending and receiving parties (102 and 104).

One such manner for compromising this shared secret key 107 could be to simply observe all message traffic 106 between the two units 102 and 104. In some cases, the statistics of the encrypted message traffic can be examined in order to glean useful hints about what the secret key 107 might be. These statistics can be easily compiled if the secret key 107 is static (i.e., unchanging). For this reason, it is desirable to create a system where the shared secret key 107 is not a single static number, but rather a number that is constantly changing, but nonetheless still able to be recreated correctly on both ends of the connection.

Figure 2:
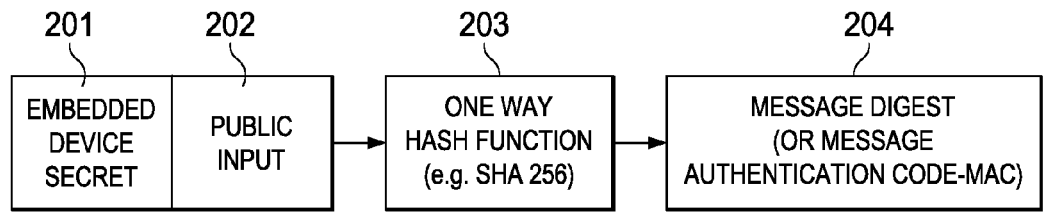
FIG. 2 illustrates one embodiment of the creation of a message digest (or a message authentication code) a one way hash function.

This desired functionality can be accomplished by using embodiments of the structure shown in FIG. 2. In this example, the variable number described above is created by first constructing a concatenated combination of two or more numbers (e.g., the embedded device secret 201 of a target device and some other number 202). This combination may then be supplied as the input to a one way hash function 203. The output resulting from this one way hash operation 203 is termed a message digest 204. For a recognized standard one way hash function (such as SHA256, for example), if any number of bits (including even a single bit) of either one of these input data elements (201, 202) changes, then the resulting message digest output 204 will also change.

Typically, this change in the hash function output 204 cannot be easily predicted without evaluating the one way hash function 203 itself. Also, in the case where one of the input data elements (either 201 or 202) is secret, then the message digest is also termed a message authentication code (or MAC, for short). The value of this MAC will be unpredictable, no matter how many of the other elements in the input data set are known. Thus, if one of the input data elements (for example, input 201 is an embedded device secret), then the public portion of the input data set can then represent the temporary value that the key server 104 sends back to the device 102 (as described with respect to FIG. 1) over a public channel 106 when it receives a request for a new connection from that device 102. By using the resulting message digest 204 (or MAC, if input data 201 is secret) as the encryption key 107 in FIG. 1, then this encryption key 107 will change each time the key server 104 returns a new value for the public number 202 to the device 102 and any entity who is not in possession of the secret portion 201 of the input data set will be able to recreate the shared encryption secret (the message digest or MAC 204).

It should be noted that standard hash functions 203 (such as SHA256), will always return a fixed length output no matter what the size of the input message (the concatenation of the embedded device secret 201 and the other number 202). This way, there is effectively no maximum required length of the concatenated input {201,202}, so either of these two may embody any data set that may be represented in digital form (e.g., a string containing the current time of day, an executable code block or even a multi-gigabyte input data file).

In general, there are typical limits for the minimum acceptable size and makeup of the elements 201, 202 of the concatenated input {201,202} to the one way hash function 203 that will make it impractically hard for an attacker to guess one of the inputs (e.g., 201) if they are in possession of the other of these inputs (e.g., 202). These limits are generally referred to as the system's minimum entropy. Regarding the upper side limit for the concatenated input {201,202}, the maximum length of this input is typically governed by the acceptable latency of obtaining a result 204 from the one way hash function 203. Thus, while the publicly visible input 202 may itself be composed of any number of individual elements, such as a list of input parameters, the time-of-day, non-repeating random numbers (called nonces) or even blocks of executable code, in some cases the practical requirements of the system will determine the upper limit on the overall size of the concatenated input {201,202}. There are numerous well-known methods for reducing the latency incurred in the evaluation of a specific one way hash function (such as 203) on an arbitrarily large block of input data. One such method (called the Merkle Tree method) uses a binary tree-based input data structure, combined with intermediate message digests that are combined in subsequent passes through the one way hash function in order to generate a valid message digest (or MAC) while incurring a minimal latency.

Using this kind of general form for the public input 202 to the one way hash function 203, there exist multiple methods for creating a "single-use" authcode (which was described earlier as a desirable feature for creating authcodes for the key server elements of the CLA). In certain embodiments this can be accomplished by using a nonce (non-repeating random number) as an additional term as a part of the evaluation of the hash function 203 in the creation (or use) of these authcodes. Since this additional term is a part of the public portion 202 of the input data, its value can be made public as well without compromising the security of the overall system as long as certain constraints are observed. In some cases, constraints on this nonce value are that it must never repeat and any future nonce values must not be able to be guessed by any attacker without access to the secret portion 201 of the hash function input.

If the methods described with respect to FIG. 2 are used to generate the encryption key 107 in FIG. 1, then in this case, the encryption key 107 is thus a number that is derived from two separate numbers (201, 202 from FIG. 2). However, as explained above, knowledge of only one of these two numbers will not be useful for an attacker who wishes to know the other number. Similarly, knowledge of only one of these two numbers (either 201 or 202) will not be useful to an attacker in trying to guess the value of the encryption key 107 when it is created in this manner. For this reason, such an encryption key 107 may be referred to as a "compound key", since it is derived from two distinct inputs, but its properties are not directly tied to either of the inputs and its value cannot be deduced from either one of the inputs without also knowing the other input. In addition, if the one way hash function 203 shown in FIG. 2 is properly chosen, then even the ability of an attacker to uncover the value of the resulting encryption key 107 will not reveal any statistically significant information about the value of the embedded device secret 201. Using this method, the ability of an external attacker to compile statistics from any messages 106 passed between the two communicants 102, 104 is greatly diminished because the encryption key 107 is now no longer a constant. This is despite the fact that both 102 and 104 contain a static shared secret (e.g., the embedded device secret 201 from FIG. 2).

Finally, if the device 102 and the key server 104 do not share the same embedded secret 201, then one or the other of these must be able to recreate the embedded secret of the other in order to subsequently recreate the proper encryption key 107. This ability to recreate the embedded secret of another device is one of the functions that differentiates a key server 104 device from any device 102 without this capability (sometimes referred to as a "target" device). If the key server 104 is required to communicate securely with more than one target device 102, then it must maintain a list of the embedded device secrets (201) for all of the target devices (102) with which it is required to interoperate in a secure fashion.

Figure 3:
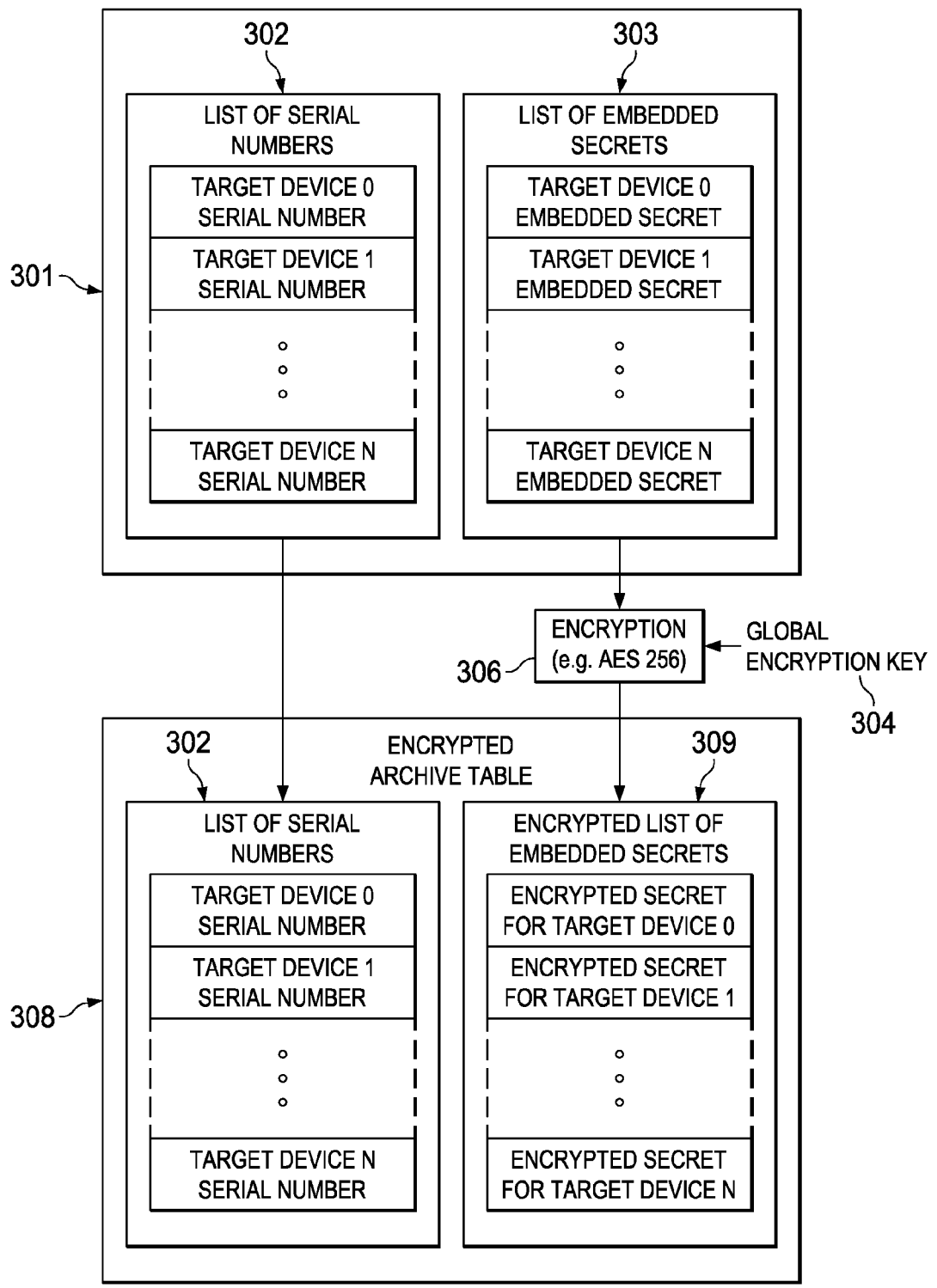
FIG. 3 illustrates an exemplary use of a global key to secure embedded device secrets.

FIG. 3 illustrates an embodiment of an implementation of a key server in a system where the key server securely stores a list of target devices and their associated embedded secrets. As shown, the key server 104 may maintain a table 301 that includes a list of the serial numbers 302 of the target devices, as well as a list 303 their associated embedded device secrets. The security of table 301 is obviously of great importance and it may be securely archived by applying a global encryption key 304 to an encryption algorithm 306, such as AES256 (the 256-bit version of the Advanced Encryption Standard algorithm) to the contents of list 303. This produces an encrypted archive table 308, which also contains two lists; the unencrypted serial number list 302 and an encrypted version of the corresponding embedded device secrets 309. This entire archive table 308 may be published without compromising the contents of the list of embedded device secrets 303.

As noted above, however, if the global encryption key 304 used to generate archive table 308 is discovered (e.g., by theft of the server 104), then the security of the entire system may be compromised. Additionally, if more than one copies of any key server 104 exists, such as in the duplicate key server scenario described earlier, then the compromise of any one of these key servers will lead to compromise of all of the key servers (and by implication, the entire system). As discussed earlier, due to the potential for denial-of-service attacks, the availability of more than a single key server 104 is nonetheless clearly desirable. Thus, it is advantageous in some embodiments to construct a system with multiple key servers that are distinctly different (for example, they may all contain different embedded device secrets) and yet are all nonetheless capable of operating with a common functionality (for example, correctly decrypting the encrypted archive table 308).

Figure 4:
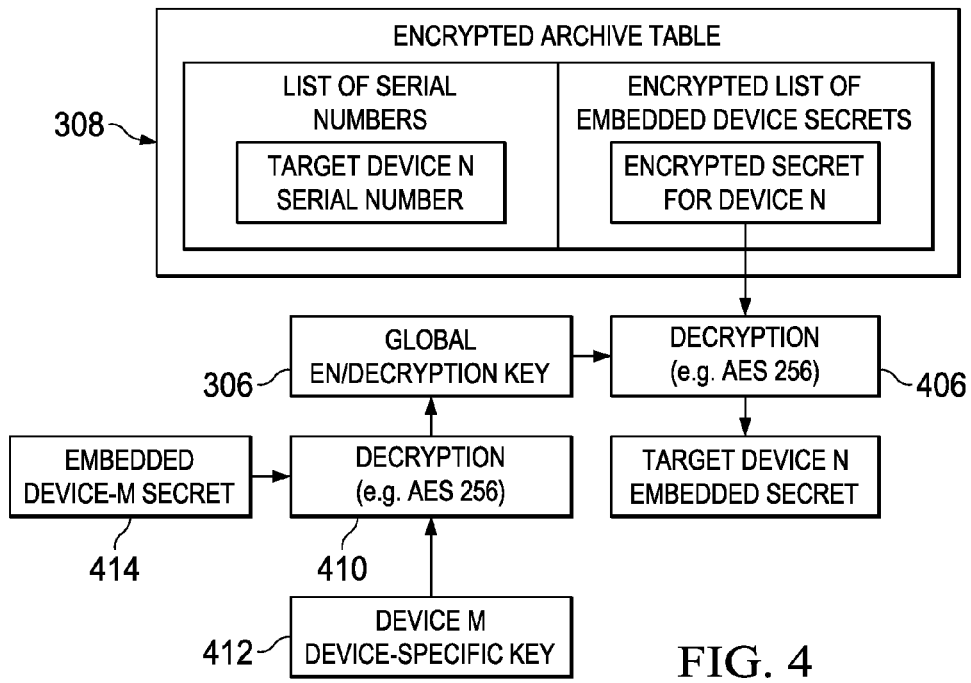
FIG. 4 illustrates an embodiment of a wrapped global key mechanism.

The system of FIG. 3 may therefore be enhanced as shown with reference to FIG. 4. In particular, FIG. 4 is diagram illustrating one embodiment of a key server 400, which contains an embedded secret 414 and has access to the encrypted archive table 308 shown previously in FIG. 3. The embedded secret 414 can be considered to be functionally equivalent to any one of the embedded secrets that are stored in the archive table 301 that was shown in FIG. 3. Thus, the device-specific serial number (which can be public) and the device-specific embedded secret 414 (which should remain secure) for this specific key server 400 could ostensibly be contained within the very same encrypted archive table 308 that we are using on this specific key server 400. However, that scenario would allow an individual key server to create device-specific keys for itself; one of which might allow this key server to determine its own embedded secret.

Recalling that the key server 400 should, in certain embodiments, be able to regenerate the global encryption key 304 in order to properly decrypt the encrypted archive table 308, the method described above and as shown in FIG. 1 and FIG. 2 may be used to employ a device-specific key 412 that is derived from the embedded secret 414 of this specific key server 400 in order to regenerate the global key 304 by means of decryption 410. In turn, that global key 304 will enable that specific key server to correctly decrypt any one of the list of encrypted embedded secrets 309 that is associated with a particular target device's serial number.

In order to generate the device specific key 412 for this specific key server 400 in the first place, the decryption process 410 described above may be reversed. Specifically, the global key 304 is encrypted with the specific key server's 400 embedded secret 414. In this manner, the value of the device-specific key 412 required to regenerate the global key 304 will be different for each specific key server 400 device that has a distinct embedded secret 414. This means that a device-specific key 412 for one key server will not be useful for a different key server, even though they may both be able to regenerate the same global key 404, albeit with different associated values of the device-specific key 412.

Thus, the value of the global key 404 can be recreated on each key server and the theft of one server (and its associated device-specific key) will not allow an attacker to use the stolen device-specific key on any other key server. It should be noted, however, that this system's security may be dependent on the ability of a device to protect the global key 304 that is regenerated as a constituent part of its key server functionality.

Figure 5:
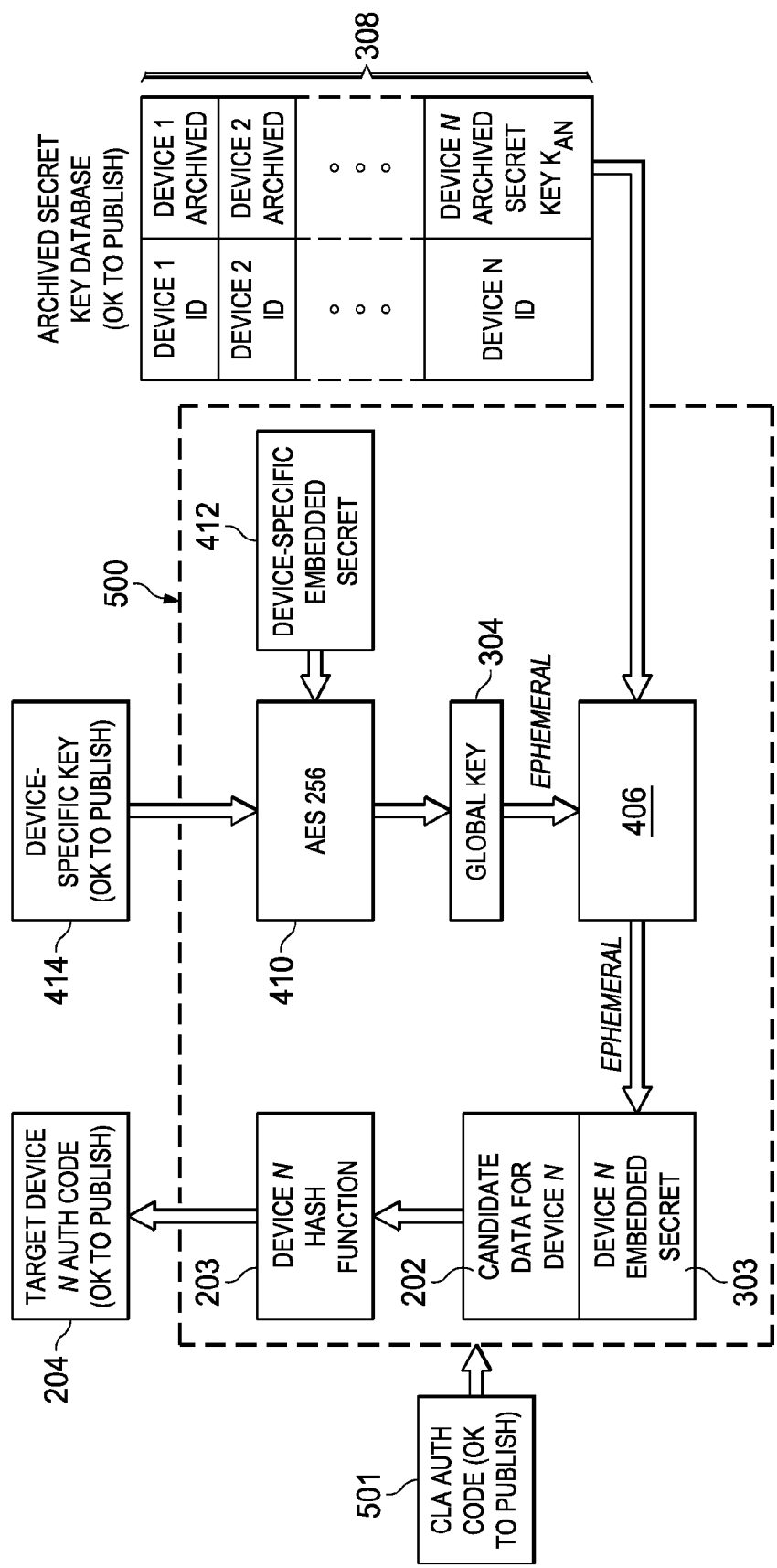
FIG. 5 illustrates an embodiment of a key server or Licensing Authority (LA) using wrapped keys and secure execution.

One embodiment of a system with this ability to recreate an intermediate value and use it in a secure manner is shown in FIG. 5. One such means for accomplishing this secure use of an intermediate value is also described in commonly-assigned, co-pending U.S. patent application Ser. No. 13/847,370, filed on Mar. 19, 2013, entitled "Method and System for Process Working Set Isolation," and PCT Application No. PCT/US2013/033009, filed on Mar. 19, 2013, entitled "Method and System for Process Working Set Isolation," and published as WO 2013/142517 on Sep. 26, 2013, which are hereby incorporated by reference in their entirety for all purposes. Other means for accomplishing this secure use of an intermediate value may also be used. In the embodiment of the system shown in FIG. 5, all of the secrets whose distribution must be controlled in order to maintain the overall system security are contained within the secure boundary 500 and all data that are shown as outside of this secure boundary 500 may be freely published without compromising the security of the overall system. The data that are created and used within the secure boundary 500 during the execution of a secure operation are thus contained within the secure boundary only for the duration of the secure operation and when that operation terminates, these data are no longer accessible by any secure operation. Thus, these data are termed "ephemeral".

It should also be noted that in embodiments of a system with substantially perfect isolation between the data inside the secure boundary 500 and the outside world, the secrets that are recreated within the secure boundary 500 may be used freely and there are no theoretical constraints on the nature of the secure operation that is performed within the boundary 500. However, there are some practical constraints that it may be desirable to observe even though the secure boundary 500 may not allow the data inside to "leak" directly to the outside, there may be a number of opportunities for indirect "side-channel" information to penetrate this secure boundary 500 during otherwise secure operation. For this reason, proper precautions should be employed using well-known techniques to prevent indirect leakage of any data generated and used during any secure operations that are executed inside secure boundary 500.

In addition, any resulting output values (e.g., target device authcode 204) that are published as a result of the secure operations executed inside secure boundary 500 should be, in certain embodiments, the result of either an encryption process (e.g., 406) where the key for that encryption process is non-constant (such as was described earlier) or a one way hash function (e.g., 203). In this manner, the resulting published output data 204 cannot be used by an attacker to deduce any of the ephemeral data generated and used within secure boundary 500. Note that embodiments of the system described above and shown in FIG. 5 may be themselves dependent on an authcode 501 in order to maintain the integrity of its own security boundary 500. The value of this authcode 501 can be generated using exactly the same method as that of the MAC 204 described in FIG. 2, where the public portion 202 of the input data to the one-way hash 203 can be the executable code that is used for the secure function contained within the dashed boundary of FIG. 5. Thus, the authcode 501 for one device (in this case, the specific key server) can be used to securely generate an authcode 204 for a (different) target device, without external visibility of the target device's embedded secret 303 to a potential attacker.

One of the advantages of a system such as the embodiment of FIG. 5 is that any authcode 204 resulting from such an operation can be freely published. Even though such an authcode 204 may be visible to anyone, only a key server such as that shown in FIG. 5 can create such an authcode and only the specific target device for which that authcode 204 is designated (the device whose embedded secret 303 was used to create it) can use this authcode 204. Further, this system is not vulnerable to malware attacks, since the operation that is executed within the secure boundary 500 is itself secured by authcode 501. The system shown in FIG. 5 may, nevertheless be vulnerable to a physical attack. If an attacker steals the entire system, then they may possibly be able to generate authcodes at will. Thus, there may be a need to further enhance the system shown in FIG. 5 to help guard against such a physical attack scenario.

In order to address this issue, a Licensing Authority (LA) system may employ multiple machines. As shown in the embodiment of FIG. 6, the LA 600 includes two different key servers (601, 602) that may be located remotely from each other. Thus, a physical attack on one of the key servers may not affect the other key server. In this embodiment, the both key servers have access to the encrypted archive table 308 that was first shown in FIG. 3. Both key servers also have distinct device specific embedded secrets 603, 604, thus forcing them to depend on different authcodes and different device-specific keys in order to perform secure operations in the correct manner (e.g., decrypting and using a portion of the public encrypted archive table 308).

In this system, a requesting device has access only to Key 1. Only the server 501 has access to Key 2 on server 503. Because two keys are required, the disadvantages of a single global key are overcome. In other words, even if an unauthorized person or device obtains Key 1, the encrypted data of table 514 still cannot be accessed. Embodiments of this type of system may, however, still be compromised in that, if one of the key servers 501, 503 is physically compromised or rendered unusable, the system may not be able to operate. Thus, devices that rely on the system to provide authorization codes may not be able to obtain these codes from the system.

Consequently, embodiments of an exemplary Licensing Authority (LA) system that utilizes a pair of key servers that operate collaboratively is shown in FIG. 6. This pair of key servers will be referred to collectively as a "duplex LA". The use of the two key servers in this manner secures the system against individual server compromise, as described above. In this embodiment, the LA employs an "A" key server (alternatively referred to as the "A server") and a "B" key server (alternatively referred to as the "B server").

In operation, the "A server" receives a request from a target device for the authorization to perform a secure function (an authorization request). Although this target device is depicted in FIG. 6 as a tablet computer (and is labeled DEVICE N), it may be any type of device, including smart phones, PCs, servers, etc. The "A Server" 601 cannot unilaterally generate the authorization (authcode) 608 for the target device, so in response to receiving the request from the target device, the "A server" 601 initiates its own request to a "B server" 602. This request is itself a request for an authcode 606 that will allow the "A server" 601 to respond to the original target device's request. The authcode request from the "A Server" 601 may also be accompanied by an additional authcode 607 for the "B server" 602 to respond to the "A server" 601 with a valid authcode 606. As discussed earlier, both of these authcodes 606, 607 may be single-use authcodes (i.e., they may be based on nonces).

When the "B server" 602 receives the authorization request and its own authcode 607 from the "A server" 601, it responds by sending the requested authcode 606 to the "A server" 601. This authcode 606 allows the "A server" 601 to respond to the original target device (Device N) with a subsequent authcode 608 for that device. Thus, only when the "A server" 601 receives authcode 606, is it able to properly generate the authcode 608 for the original target device, which it then forwards on as a part of its response to that device. The original target device (Device N) can then use the received authcode 608 to perform the desired secure function (e.g., view media files securely, execute secure applications, play games, etc.).

One of the advantages of the system of FIG. 6 is that the encrypted data remains secure, even if one of the two key servers is compromised. If, however, one of the key servers in a duplex LA is compromised, the interaction between the LA key servers will be interrupted, so the duplex LA will not be able to service any target devices' requests for authcodes. Further, if either key server is offline or subjected to a denial of service (DoS) attack, the duplex LA cannot operate. It would therefore be necessary to reinitialize both of the system's key servers before the duplex LA could resume operation.

In order to avoid these shortcomings of duplex (two-server) LA systems, some embodiments employ additional key servers. Such LA systems having more than two key servers may be referred to herein as "Cloud-based" License Authorities or CLA systems. It should be noted that though embodiments are referred to herein as CLA, embodiments of such a system may be deployed in other environments that are not cloud based, for example, through the use of inter-networked physical machines, etc. The logical functionality of one embodiment of such an exemplary CLA system is illustrated in FIG. 7. A multi-server CLA system may be configured in a variety of ways but, in most embodiments of these configurations, a first one of the key servers must be authorized by one or more different key servers before it can generate an authorization for a requesting target device. One of the key servers (for example, server 1) in the CLA system will function as the "A server", while one or more different key servers from the rest of the CLA (one or more of servers 2 through N) will collectively function as the "B server".

At this point, there are a number of different strategies that may be employed in order to cause the CLA to operate in the desired manner. In one embodiment, the "A server" sends a collection of authcodes, each derived from the individual key server's device specific embedded secrets (referred to as keys 2-N) to all of the key servers in the collection of "B servers". This broadcast to all of the key servers in the CLA does not compromise the system's security since, as was discussed earlier, any given authcode will only operate correctly on the specific device to which that specific authcode is targeted (i.e., that device which contains the embedded device secret from which that specific authcode was derived). Then, any of the individual key servers in the group of "B servers" can use its own device-specific authcode to securely generate and send a piece of the response authcode back to the "A server". The "A server" then uses the collected response from all of the responding "B servers" in order to generate the final authcode that is provided to the originally requesting target device. Each of the key servers in the system is identically configured so that it may serve as either an "A server" or a "B server". "Identically configured" is used herein to refer to the ability of the servers to perform identical functions—each server will, however, have its own hardware secret and key, and its own encrypted version of the keys for the other servers.

Another embodiment may use a slightly different method, where the "A server" need not broadcast all of the individual authcodes for each of the key servers in the "B server" collection, but rather only generate and broadcast a smaller request message containing a signature that is based on the embedded device secret for the requesting device (in this case, the "A server"). This allows the rest of the key servers (the "B servers") to verify that the requestor belongs to the CLA and it thus authorized to issue such a request in the first place. In this second scenario, each of the key servers in the CLA (including the "A server") may have a pre-loaded (and multi-use) authcode that will allow that key server to perform the correct verification of messages from members of its own CLA as well as the ability to securely generate a response to that verified message.

The question of which key server functions as the "A server", and which one functions as the "B server" may be determined in a number of ways. For example, in one embodiment, a cloud CLA system includes a load balancer that receives an authorization code request from a target device and determines, based upon loading in the system, which of the key servers should act as the "A server". The load balancer may also determine which of the available key servers may functions as an element of the "B server" group. In an alternative embodiment, the request from the target device may be broadcast to all of the servers in the CLA system, and the first one of the servers to respond to the request may be selected to function as the "A server". Similarly, the "A server" may broadcast its own request for authorization to all of the remaining CLA key servers, and the first group of the key servers to respond may be designated as belonging to the "B server" group (which may contain one or more distinct key servers, the minimum number of which can be based on CLA policy). In other words, the "B server" group may comprise more than a single key server.

While it may be desirable to utilize more than one of the CLA system's key servers (apart from the "A server") as members of the "B server" group, it would also be desirable for the makeup of this "B server" group to be flexible. In other words, the operation of the CLA may be more robust against potential loading or traffic issues if the membership in the "B server" group is not fixed, but rather comprised of any number (m) out of the total available remaining CLA key servers (which will consist of at most n−1 key servers, where n is the overall number of key servers in the CLA system). Other embodiments may include certain criteria that may be used to select the group of "B servers" depending on various loading factors or communications latencies between the "A server" and the rest of the CLA system.

One option of an embodiment for achieving this flexible grouping of "B servers" is to use a threshold encryption mechanism for producing the response authcode from the "B server" group back to the "A server". In this case, the "A server" may be selected as described above, and this server may broadcast its request for authorization to the remaining CLA key servers. In one embodiment, the "A server" may already be in possession of an encrypted version of the authcode that it has requested from the "B server" group, but it may not have the proper decryption key required to recreate the authcode in the clear. Alternately, the encrypted version of the requested authcode may be returned to the "A server" by one or more members of the "B server" group. In either case, in this embodiment, the "A server" must now be able to recreate the proper decryption key in order to decrypt the requested authcode. Using the threshold encryption process, a key for decrypting the authcode can then be split among all of the key servers in the CLA in such a manner that the number of key servers that must respond to the "A server" request must be at least m (out of the total CLA population of n key servers). The number m may, for example, be set by policy at the time that the CLA is established.

Figure 12:
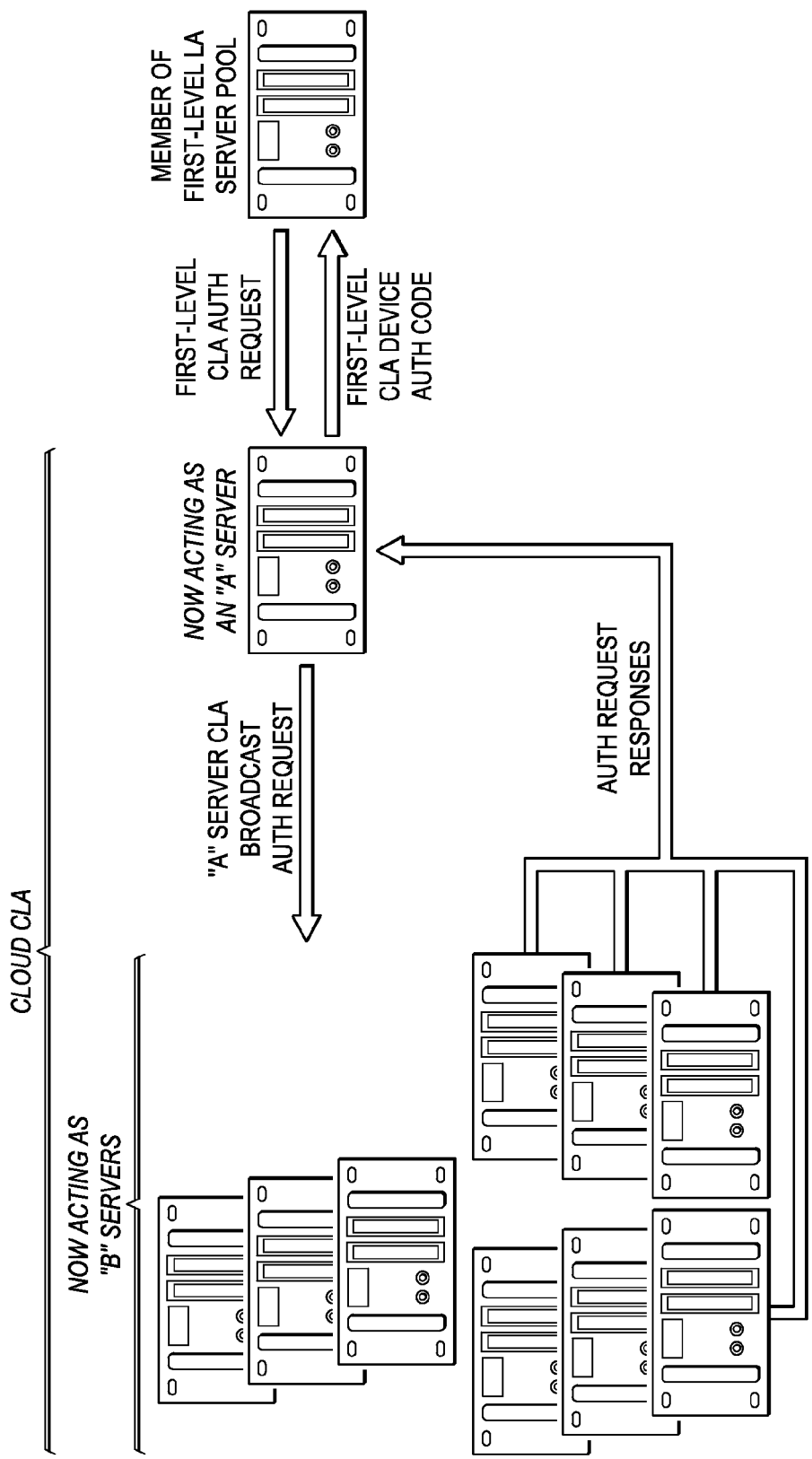
FIG. 12 illustrates the operation of one exemplary level of a hierarchical CLA structure.

Each of these remaining key servers may then respond to this request by sending a portion of the key required for decrypting the requested authcode back to the "A server". The "A" server needs to receive at least m (called the threshold number) of these responses from the collective group of "B servers" in order to be able to decrypt the requesting target device's authorization code. When the threshold number of threshold encryption inputs is received, the "A" server decrypts its own authcode and then uses that to create the subsequent authcode in response to the target device's original request. An exemplary system showing one embodiment of the communications between the various key servers in this situation is shown in FIG. 12.

Figure 8:
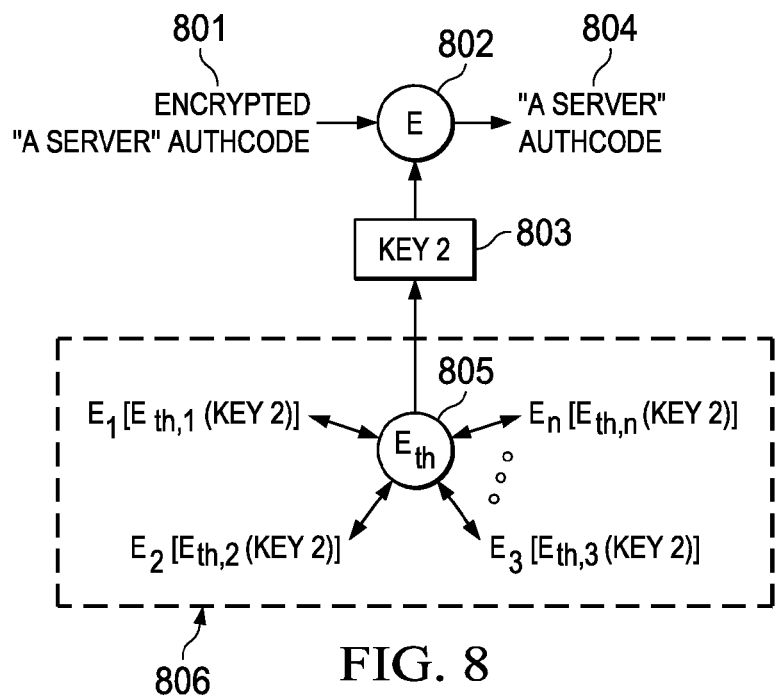
FIG. 8 illustrates one embodiment of a threshold-encryption mechanism for securing an exemplary key server's authcode.

One example of an embodiment of how this threshold encryption mechanism may operate is shown in FIG. 8. The "A server" authcode 804 is encrypted with a global encryption key "KEY 2" 803 and this global encryption key 803 is used to decrypt (802) the encrypted "A server" authcode 801. The global decryption key is recreated differently on each "A server", but the resulting value 803 is the same for all. The manner by which the global decryption key 803 is constructed on each individual "A server" may be by means of the threshold encryption process (Eth) 805, where a multiplicity of responses from the "B servers" (designated as En [Eth, 1 (KEY 2)] in FIG. 8, are received by the "A server" in order to properly recreate the value of KEY 2 (803). This group of collective "B server" responses 806 are individually secure and they may even be collectively secure if the response are all dependent to the embedded hardware secret of the specific "A server". This dependency on the embedded hardware secret of the specific "A server" can be accomplished, for example, by the means described earlier and shown in FIG. 1 and FIG. 2.

Figure 11:
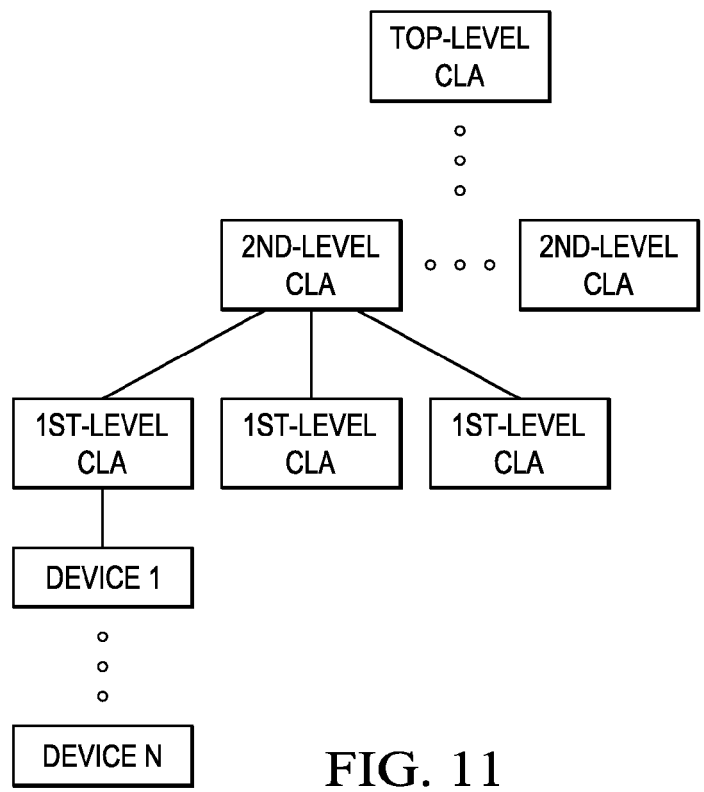
FIG. 11 illustrates the logical arrangement of one embodiment of a cascaded hierarchical CLA.
Figure 9:
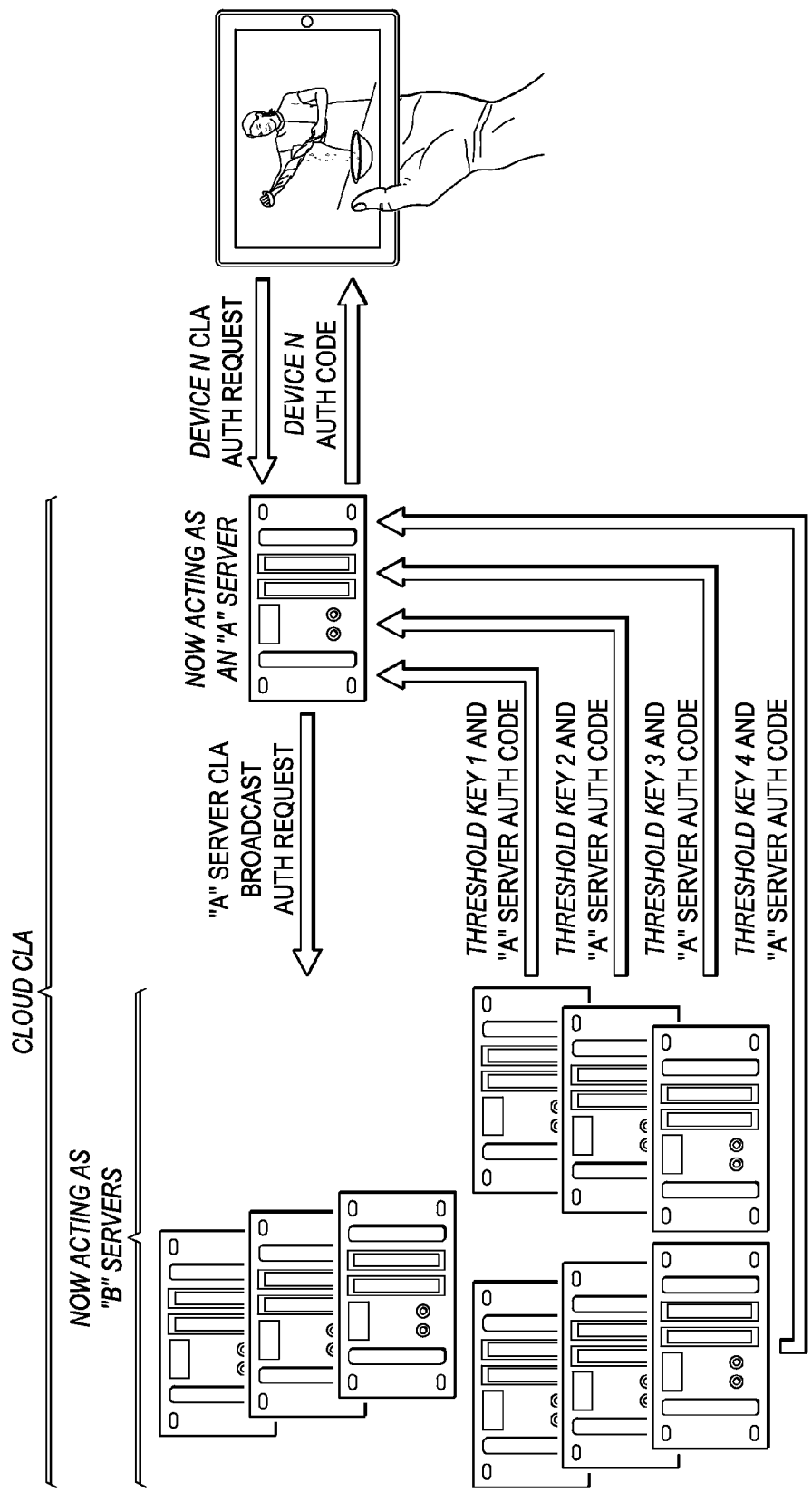
FIG. 9 illustrates one embodiment of the handling of a request for pieces of a threshold-encrypted key.

One of the advantages of such a CLA system is that the multiple key servers in the system may be distributed over a large geographic area. This makes it relatively difficult to physically compromise the system, as this would require physically compromising multiple key servers at the same time (leaving too few to accomplish the authorization process). One possible disadvantage of such a cloud-based CLA system is that newly-issued authcodes may be distributed to all of the key servers of the CLA when they are generated. In order to prevent the CLA from being overwhelmed by this synchronization traffic (as well as for other reasons), it may be desirable to split up the responsibilities of the CLA into a hierarchical series of CLA "trees". To some extent, this is similar to the hierarchical Merkel Tree structure that was discussed earlier and is used for more efficient calculation of message digests from large input data sets. Other advantages of splitting up the CLA functionality into distinct subservient CLAs include increased security. This kind of hierarchical CLA structure is shown in logical form in FIG. 11 and is reflected in a more exemplary manner in FIG. 12, where it can clearly be seen that, in certain embodiments, the only differences between a system based on a single-level CLA structure and one that is based on a hierarchical CLA are in the designation of the original target requesting device. In FIG. 9, the original requesting target device is not a key server, but in FIG. 12, it is a member of a "lower level" CLA. However, that is the only functional difference between the two examples. Thus, this kind of hierarchical CLA structure can be extended to an arbitrary number of levels.

In addition, as will be explained in greater detail below, each server may be provided with a database, encrypted with its own hardware key, that includes each other server's hardware key. In some embodiments, each server stores a table that includes every other server's secret keys encrypted using every other server's secret keys.

Referring to FIG. 9, an embodiment of an exemplary cloud CLA is illustrated. In this embodiment, the CLA uses multiple (three or more) key servers that form a distributed server pool or cloud. The key servers are configured so that they can perform the functions of both the "A server" and the "B server" group. Thus, any one of them that is available can be the "A server"—the remainder of the pool will function as the "B server" group. The servers that act as the "B server" implement a threshold encryption mechanism, so that a threshold number of the "B server" group must provide their input to the "A server" in order for the "A server" to decrypt the message.

Figure 10:
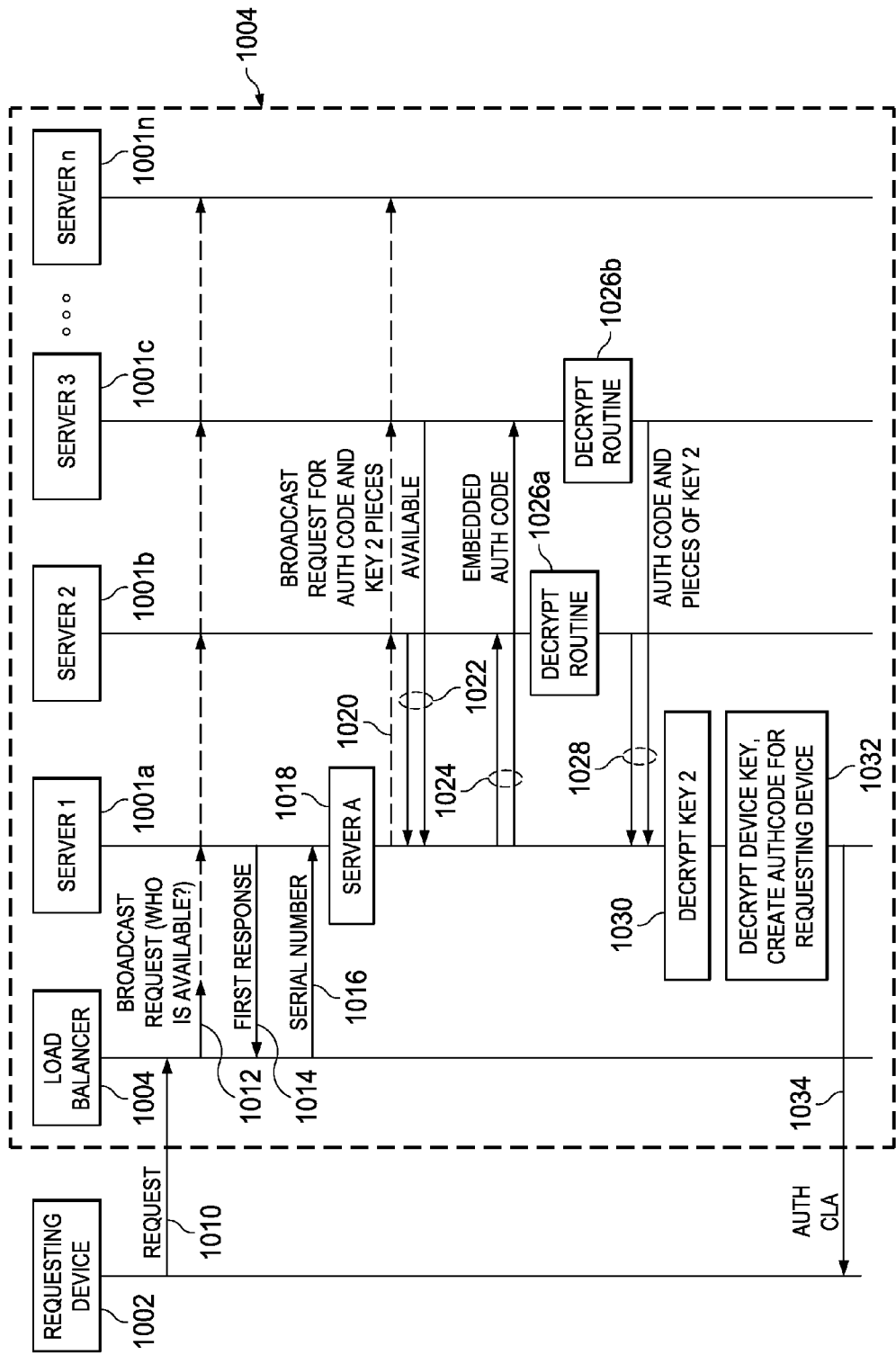
FIG. 10 illustrates a sequence diagram for one embodiment of handling an authorization request from a requesting target device.

One embodiment of the operation of an exemplary cloud CLA such as the one shown in FIG. 9 is illustrated by the flow diagram of FIG. 10. In this example, a requesting device 1002 requests an authorization code from cloud CLA 1004. CLA 1004 includes a load balancer 1006 and a plurality of key servers 1001a, 1001b, 1001c, . . . , 1001n. When requesting device 1002 sends the request for an authorization code to the CLA 1004 (action 1010), the request is received by the load balancer 1006. Load balancer 1006 then broadcasts a request to the servers 1001a-1001n (action 1012). This is a request for the servers to identify whether or not they are available. In this example, server 1001a receives the request from load balancer 1004 and is the first server to respond (at 1014). The load balancer 1006 sends the serial number of device 1002 to server 1001a (at 1016). Load balancer 1004 may also send server 1001a authorization to act as the key 1 server (the "A server"). In response, server 1001a begins functioning as the key 1 server (at 1018), and sends a broadcast request to the other servers 1001b-1001n (at 1020). This request is for an authorization code and the pieces of key 2, as the exemplary system uses threshold encryption for key 2. (In some embodiments, the authorization code may be a code for allowing the server 1001a to decrypt its stored key 1.) At 1022, a number of servers transmit their availability to the server 1001a. In this example, servers 1001b and 1001c transmit their availability to server 1001a.

At 1024, server 1001a accesses an embedded authorization code and transmits it to servers 1001b and 1001c. This authorization code is to authorize servers 1001b and 1001c to begin a routine to decrypt the threshold pieces of key 2 and transmit them to server 1001a. Such an authorization code is embedded in all the servers of the cloud CLA. At 1026a and 1026b, the servers 1001b and 1001c use their hardware secret keys to decrypt the threshold encrypted pieces of key 2. They also re-encrypt the threshold encrypted pieces of key 2 using the hardware secret keys of server 1001a. Finally, they encrypt the result with a locally-generated nonce. At 1028, servers 1001b and 1001c transmit an authorization code and the results of the encryption to the server 1001a. At 1030, the server 1001a receives the authorization code and enters a secure mode to decrypt the received pieces of key 2 using its hardware secret key. Server 1001a and also uses its hardware secret key to decrypt the stored key 1. At 1032, having access to key 1 and key 2, server 1001a decrypts a key for (or generates an authorization code for) requesting device 1002. At 1034, server 1001a transmits the key or authorization code to requesting device 1002.

As noted above, it is an advantage of this system that device secret keys and authorization codes cannot be generated by any one server. Physical compromise of the system would require theft or disabling of multiple servers. Since threshold encryption is used, it would be necessary to disable all of the servers in the pool except for the threshold number, plus one (for the "A server") in order to compromise the system. This would be much more difficult than disabling a single server. Further, DoS attacks on the CLA are prevented or, at least, made very difficult by the fact that the functions of the system are distributed across multiple key servers.

One of the possible disadvantages of embodiments of this system, however, is that the servers may have to be synchronized to propagate new authorizations. Because the CLA may be required to support many (e.g., thousands or even millions of) devices, the task of copying encrypted keys, authorization codes and possibly other data to each of the key servers can pose a daunting task. As the number of devices and or encrypted information grows, the overhead associated with synchronization of the servers can increase geometrically. In order to address this problem, one embodiment implements a hierarchical structure of servers.

An embodiment of this type of system is illustrated in FIG. 12. In this embodiment, multiple key servers are organized in a cascaded multiplex fashion. Thus, devices that require authorization codes request these codes from first-level CLA's. A first set of devices requests authorization codes from a first first-level CLA, while a second set of devices requests authorization codes from a second first-level CLA, and so on. Each of the first-level CLA's may, for example, include a set of key servers as depicted in FIG. 9, and may operate as shown in FIG. 10. The key servers within each first-level CLA must be synchronized with each other, but the servers of one first-level CLA do not have to be synchronized with the servers of a different first-level CLA.

A first-level CLA may itself require authorization to perform its functions. For example, a particular CLA may be licensed for a certain time period, or until it should be updated. For example, a CLA software time out may force periodic maintenance requests to higher-level CLA devices. If no updates are needed, first level devices may require only new authorization codes. When necessary, the first-level CLA requests an authorization code or an update from a higher-level CLA. The first-level CLA makes this request to a second-level CLA in the same manner in which a target device makes a request to the first-level CLA—there is no difference between target devices and CLA devices. At each level of the hierarchy, a CLA requests authorization codes from the CLA at the next-higher level. Similar to other devices, a first-level CLA device sends an authorization request to a second-level CLA server. The second-level server may function as the "A server" and broadcast authorization requests to the second-level "B server" cloud. The "B server" cloud may send authorization request responses to the "A server", and the "A server" in turn will send the authorization code or update to the first-level CLA device.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example, but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A licensing authority system for securely providing an authorization code to a requesting device, the system comprising:
a plurality of key servers;
wherein the plurality of key servers includes at least an "A" server and one or more "B" servers;
wherein the "A" server is configured to
receive a device authorization code request from a requesting device,
in response to receiving the device authorization code request, transmitting an "A" server authorization code request and a "B" server authorization code to the one or more "B" servers, and
upon receiving an "A" server authorization code from the one or more "B" servers responsive to the "A"server authorization code request, transmitting a device authorization code to the requesting device.

2. The licensing authority system of claim 1, wherein each of the plurality of key servers is identically configured.

3. The licensing authority system of claim 2, wherein the device authorization code request is broadcast to all of the plurality of key servers, and wherein a first one of the plurality of key servers to acknowledge the device authorization code request functions as the "A" server.

4. The licensing authority system of claim 3, wherein a single one of the plurality of key servers other than the "A" server functions as the "B" server, and wherein the "B" server transmits the server authorization code to the "A" server.

5. The licensing authority system of claim 3, wherein more than one of the plurality of key servers other than the "A" server function as the "B" servers, and wherein each of the "B" servers transmits at least a portion of a response comprising the server authorization code to the "A" server.

6. The licensing authority system of claim 5, wherein each of the "B" servers transmits a corresponding threshold key input to the "A" server, and wherein the "A" server can only transmit the device authorization code to the requesting device after receipt of at least a threshold number of the threshold key inputs from the "B" servers.

7. The licensing authority system of claim 5, wherein the key servers comprise servers of a higher-level licensing authority in a hierarchical licensing authority structure, and wherein the requesting device comprises a server of a lower-level licensing authority in the hierarchical licensing authority structure.

8. The licensing authority system of claim 2, further comprising a load balancer, wherein the load balancer is configured to:
receive the device authorization code request from the requesting device;
determine the availability of one or more of the key servers to function as the "A" server;
identify one of the key servers as the "A" server; and
forward the device authorization code request to the "A" server.

9. The licensing authority system of claim 1, wherein the "A" server is incapable of transmitting the device authorization code to the requesting device without first receiving the "A" server authorization code from the "B" server, and wherein the "B" server is incapable of transmitting the "A" server authorization code to the "A" server without first receiving the "B" server authorization code from the "A" server.

10. A licensing authority server for securely providing an authorization code to a requesting device, the licensing authority server comprising:
a CPU;
a memory that stores an encrypted secret key for at least an identified device;
a server secret key store that is inaccessible to devices other than the CPU; and one or more input/output (I/O) ports;
wherein the licensing authority server is capable of functioning as an "A" server in which
in response to receiving a device authorization code request for the identified device via the one or more I/O ports, the CPU generates a server authorization code request and outputs the server authorization code request via the one or more I/O ports
in response to receiving a server authorization code, the CPU generates an ephemeral global key, decrypts the encrypted secret key for the identified device with the ephemeral global key, generates a device authorization code for the identified device, and outputs the device authorization code for the identified device; and
wherein the device authorization code for the identified device can be generated by the CPU only after receiving the server authorization code.

11. The licensing authority server of claim 10, wherein the licensing authority server is configured to acknowledge the device authorization code request and to function as the "A" server only upon determining that the licensing authority server is a first one of one or more licensing authority servers to acknowledge the device authorization code.

12. The licensing authority server of claim 10, wherein the licensing authority server is further capable of functioning as a "B" server in which, in response to receiving a server authorization code request from a different licensing authority server via the one or more I/O ports, the CPU outputs a server authorization code via the one or more I/O ports.

13. The licensing authority server of claim 12, wherein when the licensing authority server is functioning as the "B" server, the CPU outputs a key with the server authorization code via the one or more I/O ports.

14. The licensing authority server of claim 13, wherein the key comprises a threshold key.

15. A computer program product comprising a non-transitory computer readable medium containing one or more instructions executable by a computer to perform steps including:
functioning as an "A" server, including
in response to receiving a device authorization code request from an identified device, generating a server authorization code request and outputting the server authorization code request,
in response to receiving a server authorization code responsive to the server authorization code request, generating an ephemeral global key, decrypting an encrypted secret key for the identified device with the ephemeral global key, generating a device authorization code for the identified device, and outputting the device authorization code for the identified device, and inhibiting generation of the device authorization code for the identified device until the server authorization code is received.

16. The computer program product of claim 15, wherein functioning as the "A" server includes acknowledging the device authorization code request and functioning as the "A" server only upon determining that the computer is a first one of one or more servers to acknowledge the device authorization code.

17. The computer program product of claim 15, wherein the instructions are further executable by the computer to perform functions of a "B" server including, in response to receiving a server authorization code request from a server other than the computer, outputting a server authorization code.

18. The computer program product of claim 17, wherein the instructions are further executable by the computer to perform functions of a "B" server including, outputting a key with the server authorization code.

19. The computer program product of claim 18, wherein the key comprises a threshold key.

\* \* \* \* \*